April 19, 1966   L. W. POLLOCK   3,247,003
CONTROL OF CARBON BLACK OXIDATION
Filed June 11, 1962   2 Sheets-Sheet 1

INVENTOR.
L.W. POLLOCK
BY
ATTORNEYS

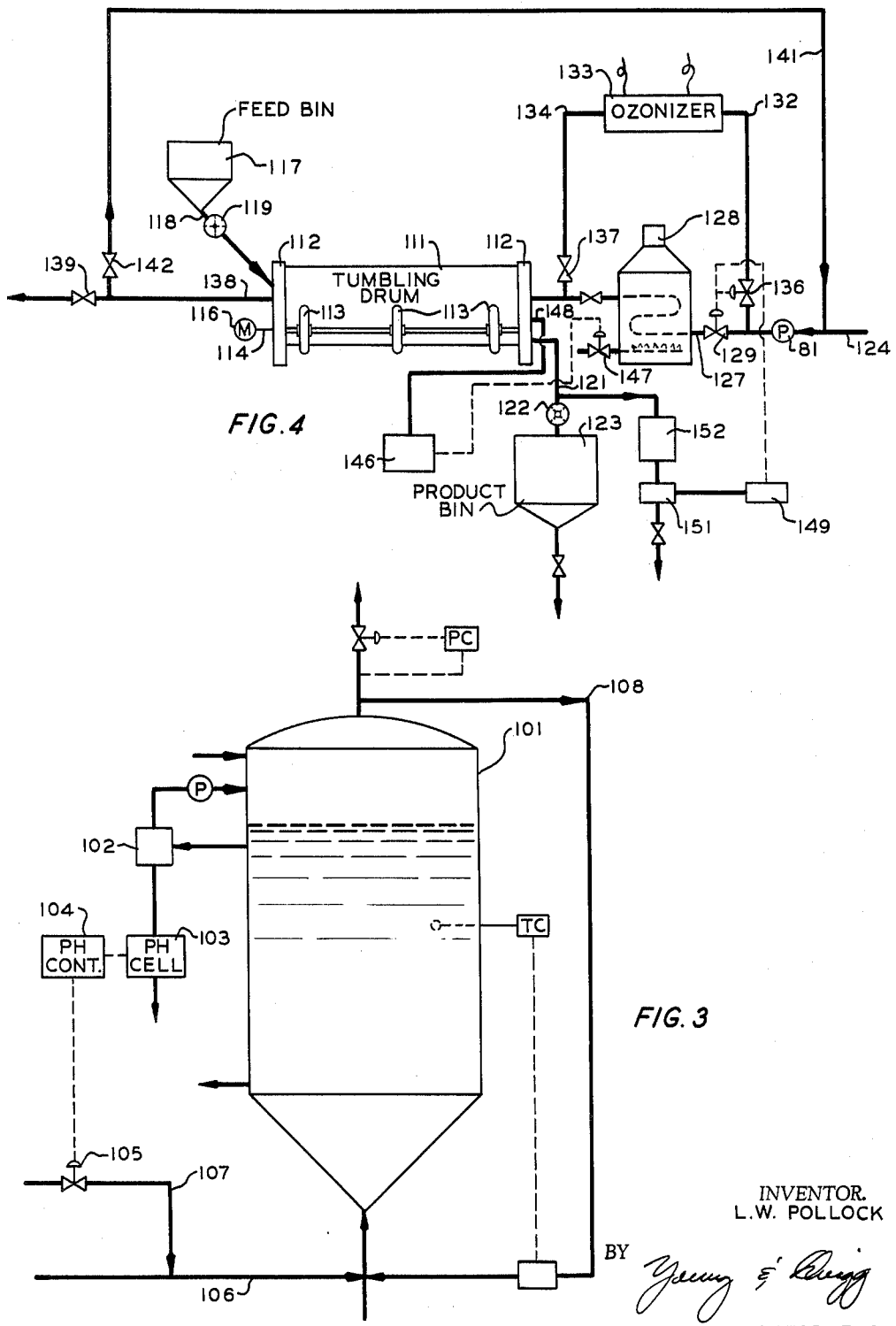

United States Patent Office 3,247,003
Patented Apr. 19, 1966

3,247,003
CONTROL OF CARBON BLACK OXIDATION
Lyle W. Pollock, Bartlesville, Okla., assignor to Phillips Petroleum Company, a corporation of Delaware
Filed June 11, 1962, Ser. No. 201,665
6 Claims. (Cl. 106—307)

This invention relates to the production of carbon black. In one aspect the invention relates to treating particulate carbon black. In another aspect the invention relates to a process for producing controlled pH carbon black by regulating an oxidation variable. In another aspect the invention relates to apparatus for regulating the oxidation of carbon black to control the pH thereof.

Carbon black has long been important in compounding rubber. In the early history much carbon black produced was manufactured by the channel process, wherein natural gas was burned in a deficiency of oxygen and the resultant flame caused to impinge upon a cooled surface to deposit the carbon formed thereon. Carbon blacks produced by this and similar processes are characterized by low pH values, and are well suited for some specific applications in compounding rubber. However, the production of carbon black by the channel black method is undesirably inefficient and requires expensive equipment.

For these and other reasons, the furnace process has come into prominence and wide-spread usage for making carbon black using gas or liquid hydrocarbon feed and permits the production of large quantities of carbon black at high yields. These blacks are usually characterized by an alkaline pH, that is greater than 7, while channel blacks have an acid pH, usually less than 6.

It has been established that furnace carbon blacks can be benefited for use in some applications by treatment at elevated temperatures in the presence of oxygen. Such treatment is believed to add reactive complexes to a greater or lesser extent to the carbon black surface, frequently effecting a reduction in pH of the black. Carbon blacks having had the pH so reduced exhibit greater utility as rubber reinforcement and as pigments. By the oxidation of furnace carbon blacks the pH of these blacks is lowered to the range for channel blacks, that is pH values less than 6. However, due to changes in one or more of the variables affecting carbon black oxidation, an oxidation step may not produce carbon black having a constant pH value. In this application, when pH values of black are referred to, unless otherwise specified the pH of a suspension of carbon black in water determined by the method of ASTM D1512—60 is meant.

An object of my invention is to control the pH reduction of carbon black which is treated by oxidation.

Another object of my invention is to produce carbon black having controlled pH values.

Another object of my invention is to oxidize carbon black to a product having a constant pH value.

Another object of my invention is to provide apparatus for oxidizing particulate carbon black to a constant pH value.

Other aspects, objects and the advantages of my invention are apparent in the written description, the drawing and the claims.

According to my invention, the pH of particulate carbon black is reduced by contacting the carbon black with an oxidizing agent under conditions to produce a pH reduction, continuously sampling the oxidized carbon black product by withdrawing a portion of the product, purging the withdrawn portion, slurrying it with water, continuously analyzing the resulting slurry for pH, and controlling an oxidation variable responsive to the measured pH value of the slurry to maintain the pH value at a desired level.

The oxidation can be by pure oxygen, by a gas containing free oxygen, by ozone, or by ozonized free oxygen-containing gas such as ozonized air, etc.

The oxidation variable controlled can be the oxidant supplied, the feedstock, a variable in the oxidizing step itself, such as temperature, contact time, etc., concentration of an oxidation catalyst, the treatment of an oxidant stream or by regulating the ozone concentration of air by regulating the output voltage of an ozonator, etc.

The control of the oxidant supplied to the carbon black can be accomplished in several ways. For example, the amount of an oxidizing agent flowing into the carbon black contact zone can be controlled. The amount of effective oxidant present in the oxidizing agent can be controlled, for example by controlling the amount of oxygen, ozone, or fresh air added to a stream of oxidizing agent. The level of oxidant also can be controlled by controlling the amount of recycle of oxidizing agent having reduced oxidant level as removed from the oxidizing zone. The level of effective oxidant also can be controlled by controlling an ozonation treatment, for example, by controlling the amount of a free oxygen-containing gas such as air which is passed through an ozonizer prior to entry into the treatment zone.

Among the variables which can cause a variation in the pH level of the carbon black without suitable control as disclosed herein include, for example, variations in the feedstock, thus causing a feed to the oxidizing zone of a carbon black having a variable pH, and variations in the oxidizing step itself, such as variations in temperature, the relative amount of effective oxidant available in the oxidizing agent, length of contact time, etc.

In this application the word "ozonized" is used in what is believed to be the normal sense to mean either the addition of ozone to a gaseous agent or the passing of the free oxygen-containing oxidizing agent through an ozonizing zone. The invention is particularly applicable to the treatment of particulate carbon black, such as black present in the form of loose particles or in the form of pellets. The oxidation can be carried out in suitable apparatus for contacting the carbon black with the oxidizing agent under conditions to produce a pH reduction, for example in a fluidized bed, a vibrating conveyor, a rotating drum, etc.

My invention is applicable to any furnace carbon black process which provides for the oxidation of carbon black. For example, it is applicable to the process described by U.S. Patent 2,682,448 (1954) of Cines, as well as other processes for oxidizing carbon black. It is especially well suited to the oxidation of carbon black in a fluidized bed as described herein. The carbon black to be oxidized can be produced by furnace black processes such as that described in Krejci, U.S. Patent 2,564,700 (1951), and other furnace black processes.

The temperature for the oxidative treatment of carbon black should be in the range of 80 to 1200° F. When using an oxygen-containing gas, such as air of normal or reduced oxygen content, the temperature is maintained in the range of 400 to 1200° F., preferably 650 to 1000° F. When using ozone, considerably lower temperatures can be utilized, in the range of 80 to 500° F., optimum effects generally being obtained at temperatures in the range of 200 to 400° F.

The length of treating time, temperature, and the oxygen content of the treating gas are interdependent variables. The treating effect for a given length of time increases with increasing temperature when using oxygen. Utilizing a free oxygen-containing oxidizing agent such as air of normal or reduced oxygen content in the temperature range of 400 to 1200° F., with one hour's exposure, it is possible to obtain a pH reduction of 4 to 5 units with a loss of not more than 2 percent of the carbon by oxidation. When using air, preferably the partial pressure of oxygen is in the range of 8 to 80 mm. Hg.

When utilizing ozone, treated blacks having a pH in the range of 2.5 to 5 are readily obtained when the ozone temperature is controlled as described above. The pH can be reduced below 6 with only 3 or 4 mg. of ozone reacted per gram of black and with an increase in ozone consumption the pH can be reduced to very low levels. When ozone is employed it ordinarily is used as an ozone-air stream. Ozone-enriched air can be employed or even pure ozone. If an ozone-oxygen stream is used, the ozone concentration is frequently around 2 volume percent, and if an ozone-air stream is used the ozone concentration is ordinarily around 1 volume percent. If desired, an ozone-nitrogen mixture can be employed.

Although the oxidation process is ordinarily applied as an after-treatment of furnace black following separation, it can be incorporated as one step of a furnace black production process. When operating in this manner, the oxidizing stream can be introduced between the quench and filtration steps without separation of the effluent gases from the black prior to oxidation.

The oxidized furnace black is suitable as a reinforcing agent in both natural and synthetic rubber, for example butyl rubber and conjugated diene homopolymers and copolymers such as butadiene/styrene and butadiene/acrylonitrile copolymers and the like.

In the drawing:

FIGURE 3 is a similar view of a system in which the supply of an oxidant added to an additive stream is controlled.

FIGURE 4 is a diagrammatic view of a tumbling drum oxidation system in which the amount of air by-passed through an ozonizer is controlled.

Figure 1:
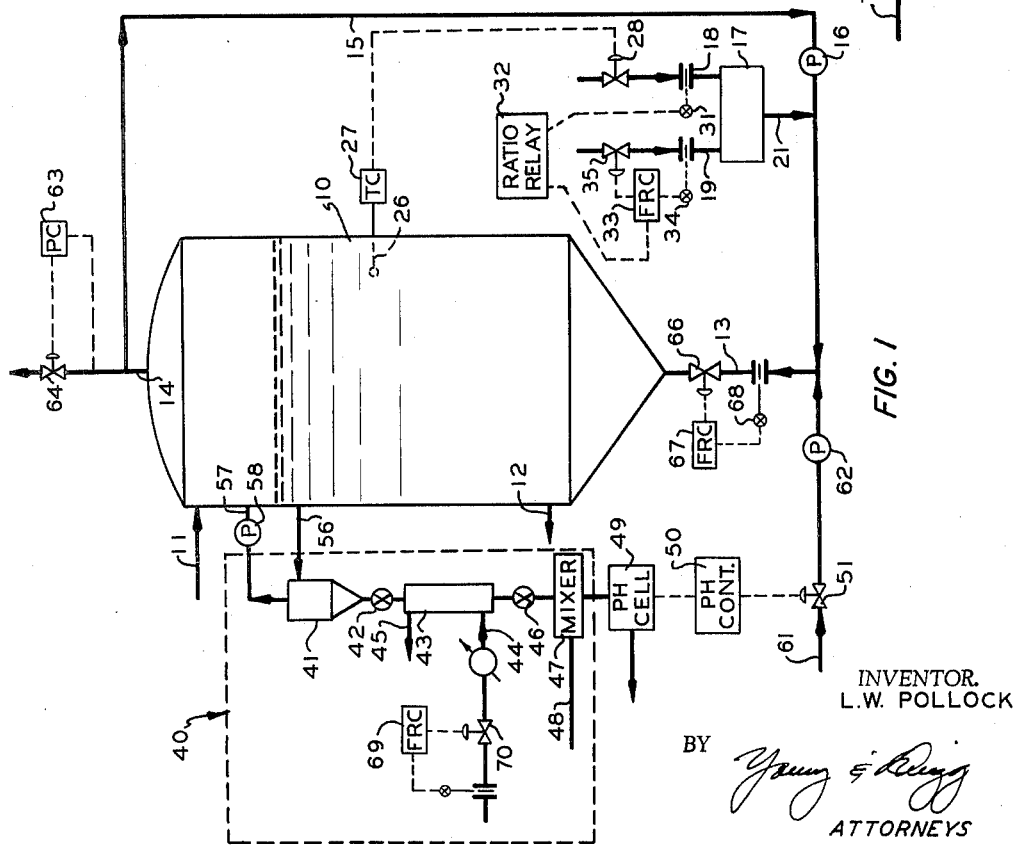
FIGURE 1 is a diagrammatic view of a fluidized bed oxidation system in which the supply of oxidant is controlled responsive to slurry pH.

In FIGURE 1, there is illustrated a fluidized bed oxidation vessel 10 provided with a feed inlet 11 and a treated product outlet 12. A fluid inlet 13 is provided in the bottom of vessel 10 and a fluid outlet 14 at the top. A fluid line 15 connects line 14 with line 13 through a blower 16. A combustion chamber 17 is provided with fuel inlet 18 and air inlet 19 and the products of combustion are conducted from chamber 17 to line 15 and thence through fluid inlet 13 to vessel 10.

To control the temperature of the bed being treated, a temperature-sensing element 26 is connected with a temperature controller 27 which controls motor valve 28 to regulate the amount of fuel fed through inlet 18. A flow-sensing element 31 measures the flow in inlet 18. The signal produced by element 31 is modified by ratio relay 32 which produces an output signal proportional to the desired air flow in inlet 19 to provide the desired fuel-air ratio in combustion chamber 17. The signal from ratio relay 32 is transmitted to adjust the set point of flow controller 33 which acts in response to a signal from flow-sensing element 34 and regulates motor valve 35.

A sample system 40 comprises a cyclone separator 41, a first air lock feeding valve 42, purge vessel 43 having purge gas inlet and outlet 44 and 45, a second air lock feeding valve 46, and a slurry mixer 47, having a liquid inlet 48. The control means comprises a pH cell 49, a controller 50 and a motor valve 51. A sample withdrawal line 56 connects the fluidized bed within vessel 10 with the sample system 40 through cyclone separator 41 while a fluid return line 57 returns separated fluid to vessel 10 by means of blower 58.

Motor valve 51 is positioned in fluid conduit 61 connected through blower 62 with fluid inlet 13.

The pressure within vessel 10 is controlled by pressure controller 63 which regulates motor valve 64.

The flow of fluid into the lower end of vessel 10 is controlled by motor valve 66 which is adjusted by controller 67 in response to the flow in pipe 13 as sensed by flow-sensing element 68 to maintain the necessary and desired flow for maintaining a fluidized bed within vessel 10.

In operation, dry carbon black pellets are fed through inlet 11 into vessel 10 and the treated, oxidized carbon black pellets are removed through outlet 12. The flow into and out of vessel 10 is regulated to maintain the desired amount of pellets within the bed at all times. If desired, a level control (not shown) can be provided to regulate either or both of the carbon black inlet and outlet.

Air is fed through fluid conduit 61, valve 51 and blower 62, into inlet 13. Simultaneously, recycle treating gas returns through the fluid return line and blower 16 into inlet 13. At the same time, where heating is desired, combustion products from combustion chamber 17 are passed through line 21 into line 15. The combined flow into fluid inlet 13 is controlled by controller 67 and motor valve 66 to maintain the flow necessary to maintain a fluidized bed within vessel 10, but insufficient to transport the carbon black pellets through fluid outlet 14. Temperature-sensing element 26 continuously measures the temperature within the bed in vessel 10 and transmits a signal to controller 27 which in turn regulates motor valve 28 to control the flow of fuel to combustion chamber 17. To maintain the proper fuel-air ratio, the flow of air is adjusted in proportion with the adjustment in the fuel flow by means of controller 33 responsive to ratio relay 32 to maintain this fuel-air ratio.

A small portion of the fluidized bed is continuously removed to sample withdrawal line 56, the carbon black pellets being separated from the fluid in cyclone separator 41, dropping through air lock feeding valve 42 into purge vessel 43. A purge gas, preferably heated nitrogen and preferably at a temperature in the range of 400 to 500° F., is passed continuously through inlet 44, upwardly through purge vessel 43 and out through outlet 45. The velocity of the purge gas is insufficient to transport the carbon black pellets upward. The pellets then are passed through air lock feeding valve 46 into slurry mixer 47 into which water is continuously passed through inlet 48 at a rate sufficient to produce a desired slurry of the pellets. The slurry is then passed through pH cell 49, wherein the pH of the slurry is measured, and the slurry then is exhausted either to a drying treatment or to waste. The pH of the slurry is measured in cell 49 and the reading transferred to controller 50, which in turn regulates valve 51 to control the amount of air which enters the system and thus to control the oxygen content of the gas which is fed through inlet 13. Preferably a controller 69 is provided to regulate a motor valve 70 to maintain the flow through inlet 44 at the desired rate.

Figure 2:
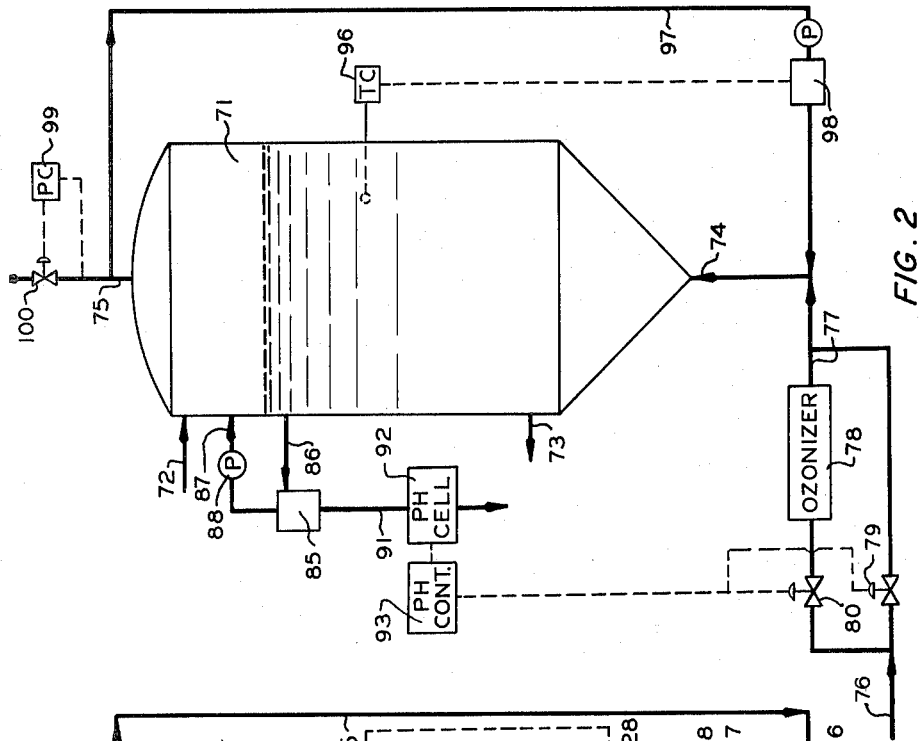
FIGURE 2 is a similar view of a system in which the relative amount of air passed through an ozonizer is controlled.

In the control system illustrated in FIGURE 2, a fluidized bed treating vessel 71 is provided with a feed inlet 72 and a treated product outlet 73, fluid inlet 74 and fluid outlet 75. A supply line 76 connects with fluid inlet 74 and is branched to provide a by-pass 77 through an ozonizer 78. Motor valves 79 and 80 are provided in line 76 and by-pass 77, respectively.

The sample system 85, similar to sample system 40 of FIGURE 1, is connected with vessel 71 by sample withdrawal line 86 and fluid return line 87 containing blower 88. The withdrawn, purged and slurried sample is passed through line 91 to pH cell 92 and thence to drying or waste. The signal from cell 92 is transmitted to controller 93 which adjusts valves 79 and 80, increasing the relative flow through ozonizer 78 when additional oxidation is required to further lower the pH of the slurried black. The temperature of the bed within vessel 71 is controlled by controller 96 which adjusts the amount of heat supplied to recycle line 97 by controlling heater 98 illustrated diagrammatically. Heater 98, for example, can be an electrical heater, a furnace, a combustion chamber supplying hot products of combustion to line 97, etc.

In operation, when dry carbon black pellets are introduced through inlet 72, sufficient fluid is introduced through inlet 74 to maintain a fluidized bed of the pellets within vessel 71. Treated pellets are removed through outlet 73. Oxygen or a free oxygen-containing gas is introduced through line 76 and passed into fluid inlet 74. A portion of the gas applied through line 76 is allowed to pass through line 77 and thus through ozonizer 78 where a portion of the oxygen is converted to ozone. The amount passed through ozonizer 78 and thus the ozone concentration of the gas supplied to vessel 71, is controlled by controller 93 which regulates the relative opening of valves 79 and 80 to control the amount of gas by-passed to the ozonizer. As in FIGURE 1, the total amount of gas introduced into vessel 71 can be controlled by a control valve (not shown) in line 74. Also, as in FIGURE 1, the pressure in vessel 71 is controlled by a controller 99 and a motor valve 100.

In FIGURE 3, a similar treating vessel 101, sample system 102, pH cell 103 and controller 104 are provided to control the amount of an oxidant added to a supply line 106 through additive inlet 107, motor valve 105 being regulated by controller 104. For example, an inert gas or a gas containing a relatively small amount of free oxygen can be introduced through supply line 106, and oxygen in controlled amounts, depending on the pH of the treated black, introduced through additive inlet 107. On the other hand, ozone can be added through line 107 to a stream containing various amounts or no amount of an oxidant. The control or by-pass 108 is similar to that illustrated in FIGURES 1 and 2.

My invention also is applicable to other types of treating vessel, for example tumbling drums, vibrating conveyors, etc. FIGURE 4 illustrates a tumbling drum system in which the drum 111, having end closures 112, is provided with rollers 113 disposed on shaft 114 rotated by motor 116 for rotating the drum. Material feed bin 117 is provided for introducing the material through line 118 and star valve 119 into drum 111. Treated material is removed from drum 111 through line 121 and star valve 122 into product bin 123. Intake line 124 connects with pump 81, the effluent from which can be transmitted to drum 111 through line 127 which passes through heater 128 and valves 129 and 131, or through line 132, through ozonizer 133, and line 134 into drum 111. Valves 136 and 137 are provided in lines 132 and 134 for controlling the flow through ozonizer 133. Oxidant-depleted gas is removed from drum 111 through conduit 138 and can exhaust to the atmosphere through valve 139 or be returned through recycle line 141 and valve 142 to intake 124.

The temperature in drum 111 is controlled by controller 146 which regulates motor valve 147 to control the supply of fuel to heater 128 in response to the temperature within drum 111, which can be measured by a thermocouple extending into the drum as indicated at 148.

The amount of the treating gas which is permitted to flow through ozonizer 133 is controlled by controller 149 in response to the pH measured by pH cell 151 of a slurry produced in sample system 152 similar to sample system 40 of FIGURE 1. Motor valves 136 and 129 are regulated by controller 149.

As pointed out above, my invention is applicable to the control of an oxidation variable. The temperature of the oxidation step, for example, can be controlled by using the output of controller 50 to adjust the set point of controller 27 (FIGURE 1), by using the output of controller 93 to adjust the set point of controller 96 (FIGURE 2), by using the output of controller 104 to control the temperature in vessel 101 (FIGURE 3), by using the output of controller 149 to adjust the set point of controller 146, etc. The ozone concentration can be controlled by using the output of controller 93 to adjust the output voltage of ozonizer 78 (FIGURE 2), by using the output of controller 149 to adjust the output voltage of ozonizer 133 (FIGURE 4), etc. Contact time can be controlled by controlling the rate at which the carbon black is fed through the oxidation zone, and this also can be controlled by the output of the pH controller. Other systems for the control of an oxidation variable can be utilized.

EXAMPLE I

The hydrocarbon feedstock utilized for preparing the carbon black of the examples was an aromatic concentrate oil obtained by liquid sulfur dioxide extraction of cycle oils from the catalytic cracking of gas oils. The properties of the oil are shown in Table I below.

*Table I*

OIL FEEDSTOCK

| | |
|---|---|
| Gravity, °API | 11.0 |
| Vac. dist. ° F @ 760 mm. Hg: | |
| First drop | 470 |
| 5% | 558 |
| 10 | 587 |
| 20 | 611 |
| 30 | 639 |
| 40 | 660 |
| 50 | 681 |
| 60 | 711 |
| 70 | 761 |
| 80 | 820 |
| 90 | 867 (82%) |
| BMCI | 90.4 |
| Viscosity, SUS @: | |
| 100° F. | 81.9 |
| 210° F. | 37.6 |
| Carbon, wt. percent | 88.8 |
| Hydrogen, wt. percent | 9.5 |
| Sulfur, wt. percent | 1.29 |
| Carbon residue, Ramsbottom, wt. percent | 1.61 |
| B.S.&W., vol. percent | 0.17 |
| Pour point, ° F. | 45 |

A low structure furnace carbon black made in the presence of 50 p.p.m. (wt.) of KCl, having an oil absorption value of 0.95 cc. of oil per gram of black and a pH value of 8.7, was subjected to treatment with ozone at various temperatures. Ozonization was carried out in a tube reactor using ozone produced from a commercially available ozonator (Wellsbach ozonator). In addition to longitudinal flow through the reactor tube, two additional inlets were provided in the reactor tube for introducing the ozone stream tangentially. Twenty parts by weight of carbon black were reacted with 3 parts by weight of ozonized air per minute for a period of 15 minutes for each run. The concentration of ozone in the air stream was varied to obtain different degrees of ozonation at the various temperature levels. Variation of the ozone concentration in the air was accomplished by regulating the output voltage of the ozonator. The reactor tube was insulated and the temperature was measured by an iron-constantan thermocouple.

The concentration of ozone in the air stream was determined iodometrically. A measured volume of ozonized air was passed through a gas washing bottle containing 2 weight percent potassium iodide (KI) in 0.1 molar potassium dihydrogen phosphate solution

$(KH_2PO_4)$

The resulting solution was acidified by the addition of 10 weight percent sulfuric acid and the liberated iodine was titrated with standard sodium thiosulfate solution $(Na_2S_2O_3)$, using starch as the indicator.

The reduction of pH from surface treatment of the carbon black with ozone at various concentrations and temperatures is shown in Table II.

Table II

AV. TEMP., 100° C.

| Run No. | Conc. of $O_3$ (wt. percent in air) | Net $O_3$ Reacted (mg./g. of black) | pH |
|---|---|---|---|
| 1 | 0.11 | 2.4 | 6.7 |
| 2 | 0.28 | 6.5 | 6.8 |
| 3 | 0.33 | 7.5 | 5.2 |
| 4 | 0.53 | 12.1 | 4.6 |
| 5 | 0.85 | 19.8 | 3.6 |
| 6 | 1.03 | 23.1 | 3.3 |
| 7 | 1.35 | 27.7 | 3.3 |

AV. TEMP., 200° C.

| | | | |
|---|---|---|---|
| 8 | 0.16 | 3.6 | 5.6 |
| 9 | 0.30 | 6.8 | 5.1 |
| 10 | 0.34 | 7.6 | 4.2 |
| 11 | 0.64 | 14.6 | 3.7 |
| 12 | 0.89 | 20.2 | 3.7 |

The data in Table II indicate that pH reduction to the desired level can be achieved effectively in the temperature range of 100 to 200° C., and that the reduction obtained is a function of the concentration of ozone in the treating air.

EXAMPLE II

Various physical and chemical properties of the ozonized black from Run 10 of Example I and the original low structure black are shown and compared with a commercially obtained channel black in Table III:

Table III

| | Low structure furnace black | Low structure furnace black ozonized at 200° C. | Channel black |
|---|---|---|---|
| pH | 8.7 | 4.2 | 4.5 |
| Oil absorption, cc./g. | 0.95 | 0.95 | 0.90 |
| Benzene extractable, percent | 0.16 | 0.14 | 0.03 |
| Volatile matter, percent | 1.17 | 1.65 | 5.13 |
| Ash, percent | 0.08 | 0.08 | 0.04 |
| Hydrogen, percent | 0.28 | 0.30 | 0.71 |
| Oxygen, percent | 0.51 | 0.68 | 3.40 |
| Iodine No. (Michelin) | 121 | 113 | 189 |
| DPG absorption, microequiv. | 7.1 | 21.3 | 38.7 |
| $NaBH_4$ test, percent $H_2$ uptake | 0.017 | 0.017 | 0.028 |
| $N_2$ surface area, m.²/g. | 78 | 74 | 60 |

The data show that onization effected a moderate increase in oxygen content and volatile matter. The low pH and high DPG absorption of the ozonized black indicates that the oxygen is incorporated in the form of strongly acidic groups. The treated black maintained its acidity upon degassing in a high vacuum at 150° C. for several hours and the pH was not altered significantly after heat treatment in an air stream at 400° C. for half an hour. These tests indicate the stability of the acidic groups.

EXAMPLE III

The low structure furnace black employed in Examples I and II (hereinafter designated as "A") was subjected to surface ozonation with ozone at 110° C. to give a product with a pH of 2.9, designated as "Treated A." Another low structure black made in the presence of 150 p.p.m. (wt.) of KCl, and having an oil absorption 0.85 cc./g. (hereinafter designated as "B"), was treated with ozone at 100° C. to give a product with a pH of 4.3, designated as "Treated B."

The treated blacks, parent blacks, and a sample of commercial channel black were evaluated in the following compounding recipe using natural rubber:

| | Parts by weight |
|---|---|
| Natural rubber (#1 smoked sheet) | 100 |
| Carbon black | 40 |
| Stearic acid | 3 |
| Zinc oxide | 5 |
| Altax [1] | 0.6 |
| Sulfur | 2.5 |

[1] 2,2'-dibenzothiazyl disulfide.

The stocks were milled, cured 30 minutes at 293° F., and physical properties determined. Results are shown in Table IV:

Table IV

| | Treated A | A | Treated B | B | Channel black |
|---|---|---|---|---|---|
| Ozonizing temperature, ° C. | 110 | | 100 | | |
| pH | 2.9 | 8.7 | 4.3 | 9.7 | 4.0 |
| Compounded ML-4 at 212° F. | 67.0 | 67.0 | 78.0 | 73.0 | 71.0 |

PHYSICAL PROPERTIES OF CURED STOCKS (30 MIN.)

| | Treated A | A | Treated B | B | Channel black |
|---|---|---|---|---|---|
| Cross-link density, $\nu \times 10^4$, moles/cc. | 1.50 | 1.86 | 1.38 | 1.60 | 1.39 |
| 300% modulus, p.s.i. | 1,400 | 1,760 | 1,070 | 1,230 | 1,330 |
| Tensile, p.s.i. | 4,170 | 4,470 | 4,400 | 4,590 | 4,240 |
| Elongation, percent | 585 | 540 | 640 | 620 | 600 |
| Crescent tear, lb./in. at 200° F. | 295 | 270 | 300 | 300 | 325 |

These data show that the ozonized blacks were similar in most respects to channel black. The ozonized blacks imparted lower modulus to the rubber stocks than the parent blacks.

EXAMPLE IV

The two ozonized blacks and the channel black employed in Example III were evaluated in a butadiene/styrene rubber prepared by emulsion polymerization at 122° F. in a fatty acid soap emulsified recipe and coagulated with salt-acid. It had a bound styrene content of 23.5 weight percent and a Mooney value (ML-4 at 212° F.) of 48 (SBR 1000). The following compounding recipe, known as SBR 1000, was employed:

| | Parts by weight |
|---|---|
| Butadiene/styrene rubber | 100 |
| Carbon black | 40 |
| Zinc oxide | 3 |
| BRT #7 [1] | 6 |
| Sulfur | 1.75 |
| Santocure [2] | 0.8 |

[1] Refined coal-tar product; nontoxic, dark-colored, viscous liquid; sp. gr., 1.20–1.25; Engler specific viscosity at 100° C., 6–9.
[2] N-cyclohexyl-2-benzothiazolesulfenamide.

The stocks were milled, cured 30 minutes at 307° F., and physical properties determined. Results are shown in Table V.

Table V

|  | Treated A | Treated B | Channel Black |
|---|---|---|---|
| Ozonizing temperature, °C | 110 | 100 |  |
| pH | 2.9 | 4.3 | 4.0 |
| Compounded MS-1½ at 212° F | 30.0 | 36.3 | 34.0 |

PHYSICAL PROPERTIES OF CURED STOCKS (30 MIN.)

|  |  |  |  |
|---|---|---|---|
| Cross-link density, $\nu \times 10^4$, moles/cc | 1.58 | 1.50 | 1.43 |
| 300% modulus, p.s.i | 970 | 920 | 770 |
| Tensile, p.s.i | 3,285 | 3,360 | 3,100 |
| Elongation, percent | 610 | 660 | 670 |
| $\Delta T$, °F | 61.5 | 65.5 | 66.9 |
| Resilience, percent | 61.9 | 57.6 | 59.2 |
| Shore A hardness | 60 | 61 | 61 |
| Abrasion loss, grams | 14.14 | 15.77 | 16.36 |

The stocks in which the ozonized blacks were employed were more resistant to abrasion than the commercial channel black. They had slightly higher tensile strength and lower heat build-up. Differences, however, were not pronounced, the treated blacks being similar in most respects to the channel black.

The specific examples described hereafter were carried out on loose and pelleted HMF and HAF blacks.

The oxidations were carried out in a rotating glass cylinder into which a stream of oxidizing gas was introduced along the axis. The cylinder was equipped with a squirrel cage to insure intimate contact between the gas and black. The predetermined temperature was maintained by suitable control.

The pH determinations were made as follows: one gram of the black was placed in 25 ml. of water, boiled for fifteen minutes, and allowed to cool to room temperature after which the water was decanted and the pH of the remaining sludge was measured with a Beckman pH meter.

EXAMPLE V

A number of runs were made with pelleted HMF using air as the oxidizing gas except in the control test wherein nitrogen was used instead of air. The results are as listed below. The initial sample had a pH between 9.0 and 10.0 and formed soft pellets.

| Treating Temperatures | Treating time, minutes | pH |
|---|---|---|
| 630 | 60 |  |
| 640 | 30 | 9.1 |
| 650 | 2 | 9.3 |
| 785 | 90 | 6.8 |
| 790 | 60 | 7.0 |
| 837 | 75 | 5.6 |
| 837 | 60 | 6.2 |
| 838 | 30 | 7.7 |
| 838 | 120 | 4.4 |
| 839 | 90 | 4.9 |
| 973 | 25 | 5.6 |
| 1,028 | 16 | 6.4 |

EXAMPLE VI

Using pelleted HMF and HAF blacks, it was found to be difficult to effect the desired pH reduction without excessive burning of the black if undiluted air were used. Runs were made using undiluted air with loose HMF black and nitrogen-diluted air of the indicated oxygen content with the pelleted blacks, and a one hour treating time. Results were as follows:

LOOSE HMF USING AIR

| Temperature, °F.: | pH |
|---|---|
| Untreated | 8.9 |
| 432 | 7.7 |
| 457 | 7.6 |
| 572 | 7.4 |
| 608 | 7.1 |
| 667 | 6.7 |
| 702 | 5.6 |
| 707 | 4.6 |
| 752 | 3.3 |
| 828 | 3.1 |
| 921 | 3.3 |
| 1,044 | 3.5 |

PELLETED HMF—OXYGEN CONTENT OF GAS, 10 PERCENT

| Temperature, °F.: | pH |
|---|---|
| Untreated | 9.3 |
| 565 | 8.7 |
| 648 | 7.7 |
| 725 | 6.2 |
| 738 | 5.4 |
| 759 | 4.7 |
| 797 | 4.0 |
| 817 | 4.3 |

PELLETED HAF—OXYGEN CONTENT OF GAS, 2.5 PERCENT

| Temperature, °F.: | pH |
|---|---|
| Untreated | 9.9 |
| 666 | 7.2 |
| 716 | 7.1 |
| 752 | 5.5 |
| 770 | 4.8 |
| 817 | 4.6 |

These data show variation in pH with oxygen content of treating gas and temperature.

EXAMPLE VII

Pelleted HMF and HAF blacks were treated at atmospheric temperature with air which had been passed through a semi-corona type electrical discharge. The black to be treated was placed inside an upright glass tube having a fritted disc in the lower end on which the black rested and through which the treated air was blown.

The discharge tube was of such construction as to produce a semi-corona type discharge, the principal reaction product on the passage of air therethrough being ozone.

The blacks were treated with a predetermined volume of ozonized air, after which the pH was determined. The following data shown the relation between change in pH and the volume of ozonized air with which the blacks were treated.

Since the surface area of the HMF black is 77.0 square meters per gram and that of the HAF black is 37.3, the following table includes a column showing, for HAF, the amount of air for a total surface area equivalent to that of the HMF.

| HMF | | HAF | | |
|---|---|---|---|---|
| Vol. air | pH | Vol. air | pH | Vol. air for area equal to HMF |
| 2.5 | 9.5 | 5.0 | 9.4 |  |
| 5.0 | 8.7 | 7.5 | 8.8 |  |
| 7.5 | 8.0 | 10.0 | 8.6 | 4.8 |
| 8.75 | 7.3 | 15.0 | 7.6 | 7.3 |
| 10.0 | 6.7 | 20.0 | 6.8 | 9.7 |
| 12.5 | 5.3 | 25.0 | 5.7 | 12.1 |
| 15.0 | 4.3 | 30.0 | 4.6 | 14.5 |
| 17.5 | 3.6 | 35.0 | 3.8 | 16.9 |
| 20.0 | 3.3 | 40.0 | 3.5 | 19.4 |
| 24.0 | 3.2 |  |  |  |

Reasonable variation and modification are possible within the scope of my invention which sets forth method and apparatus for controlling the oxidation of particulate carbon black to obtain a desired pH value including novel sampling means and method.

I claim:

1. A process for the oxidation of particulate carbon black to reduce the pH thereof, which comprises:
contacting said carbon black with an oxidizing agent under conditions to produce a pH reduction;
continuously sampling the oxidized carbon black product by withdrawing a portion thereof;
continuously separating the withdrawn portion from fluid associated therewith;
continuously passing the separated, withdrawn portion into a purging zone;
continuously purging the withdrawn and separated portion in said purge zone with an inert gas;
continuously slurrying the withdrawn, separated and purged portion with water;
continuously analyzing the resulting slurry for pH; and
controlling the oxidant supplied to said carbon black responsive to the pH value of said slurry to maintain said pH value at a desired level.

2. A process for the oxidation of particulate carbon black to reduce the pH thereof, which comprises:
maintainig said carbon black in a fluidized bed;
contacting said carbon black in said bed with an oxidizing agent under conditions to produce a pH reduction;
continuously sampling the oxidized carbon black product by withdrawing a portion thereof;
continuously separating the withdrawn portion from fluid associated therewith;
continuously passing the separated, withdrawn portion into a purging zone;
continuously purging the withdrawn and separated portion in said purge zone with an inert gas;
continuously slurrying the withdrawn, separated and purged portion with water;
continuously analyzing the resulting slurry for pH; and
controlling the oxidant supplied to said carbon black responsive to the pH value of said slurry to maintain said pH value at a desired level.

3. A process for the oxidation of particulate carbon black to reduce the pH thereof, which comprises:
contacting said carbon black with ozone under conditions to reduce the pH thereof;
continuously sampling the oxidized carbon black product by withdrawing a portion thereof;
continuously separating the withdrawn portion from fluid associated therewith;
continuously passing the separated, withdrawn portion into a purging zone;
continuously purging the withdrawn and separated portion in said purge zone with an inert gas;
continuously slurrying the withdrawn, separated and purged portion with water;
continuously analyzing the resulting slurry for pH; and
controlling the amount of ozone supplied responsive to the pH value of said slurry to maintain said pH value at a desired level.

4. A process for the oxidation of particulate carbon black to reduce the pH thereof, which comprises:
contacting said carbon black with ozonized air under conditions to produce a pH reduction;
continuously sampling the oxidized carbon black product by withdrawing a portion thereof;
continuously separating the withdrawn portion from fluid associated therewith;
continuously passing the separated, withdrawn portion into a purging zone;
continuously purging the withdrawn and separated portion in said purge zone with an inert gas;
continuously slurrying the withdrawn, separated and purged portion with water;
continuously analyzing the resulting slurry for pH; and
controlling the degree of ozonation of said air responsive to the pH value of said slurry to maintain said pH value at a desired level.

5. A process for the oxidation of particulate carbon black to reduce the pH thereof, which comprises:
contacting said carbon black with ozonized air under conditions to produce a pH reduction;
continuously sampling the oxidized carbon black product by withdrawing a portion thereof;
continuously separating the withdrawn portion from fluid associated therewith;
continuously passing the separated, withdrawn portion into a purging zone;
continuously purging the withdrawn and separated portion in said purge zone with an inert gas;
continuously slurrying the withdrawn, separated and purged portion with water;
continuously analyzing the resulting slurry for pH; and
controlling the amount of ozone supplied to said air responsive to the pH value of said slurry to maintain said pH value at a desired level.

6. A process for the oxidation of particulate carbon black to reduce the pH thereof, which comprises:
contacting said carbon black with ozonized air under conditions to produce a pH reduction;
continuously sampling the oxidized carbon black product by withdrawing a portion thereof;
continuously separating the withdrawn portion from fluid associated therewith;
continuously passing the separated, withdrawn portion into a purging zone;
continuously purging the withdrawn and separated portion in said purge zone with an inert gas;
continuously slurrying the withdrawn, separated and purged portion with water;
continuously analyzing the resulting slurry for pH; and
controlling the amount of said air passed through an ozonizer prior to contact with said carbon black responsive to the pH value of said slurry to maintain said pH value at a desired level.

References Cited by the Examiner

UNITED STATES PATENTS

| | | | |
|---|---|---|---|
| 1,450,023 | 3/1923 | Edelman | 23—230 |
| 2,299,109 | 10/1942 | Rand | 23—230 |
| 2,607,718 | 8/1952 | Suthard | 23—253 |
| 2,682,448 | 6/1954 | Cines | 23—209.1 |
| 2,984,547 | 5/1961 | Antonsen | 23—209.1 |

MAURICE A. BRINDISI, *Primary Examiner.*